US012394952B2

(12) United States Patent
Yu

(10) Patent No.: US 12,394,952 B2
(45) Date of Patent: Aug. 19, 2025

(54) SCREW LAMP CAP AND SCREW LAMP SOCKET

(71) Applicant: NINGBO WELL ELECTRIC APPLIANCE CO., LTD., Ningbo (CN)

(72) Inventor: Guolin Yu, Ningbo (CN)

(73) Assignee: NINGBO WELL ELECTRIC APPLIANCE CO., LTD., Ningbo (CN)

( * ) Notice: Subject to any disclaimer, the term of this patent is extended or adjusted under 35 U.S.C. 154(b) by 325 days.

(21) Appl. No.: 18/088,637

(22) Filed: Dec. 26, 2022

(65) Prior Publication Data

US 2024/0146009 A1 May 2, 2024

(30) Foreign Application Priority Data

Oct. 28, 2022 (CN) ........................ 202222901533.X

(51) Int. Cl.
*H01R 33/06* (2006.01)
*H01R 33/22* (2006.01)

(52) U.S. Cl.
CPC ............. *H01R 33/22* (2013.01); *H01R 33/06* (2013.01)

(58) Field of Classification Search
CPC ................................ H01R 33/06; H01R 33/22
USPC .......................................................... 439/753
See application file for complete search history.

(56) References Cited

U.S. PATENT DOCUMENTS

| | | | | | |
|---|---|---|---|---|---|
| 1,623,067 | A * | 4/1927 | Oakley | B21D 51/16 | 29/512 |
| 5,848,909 | A * | 12/1998 | Tsai | H01R 33/22 | 439/206 |
| 7,025,612 | B1 * | 4/2006 | Keilholz | H01R 33/22 | 439/226 |
| 7,178,969 | B1 * | 2/2007 | Shiang | H01R 13/64 | 439/615 |
| 7,833,059 | B2 * | 11/2010 | Henrici | H01R 33/22 | 439/615 |
| 2004/0014364 | A1 * | 1/2004 | Yang | H01R 33/22 | 439/667 |

FOREIGN PATENT DOCUMENTS

CN 112271521 A * 1/2021 ............ H01R 33/22

* cited by examiner

*Primary Examiner* — Renee S Luebke
*Assistant Examiner* — Paul D Baillargeon

(57) ABSTRACT

A screw lamp cap and a screw lamp socket are provided. The screw lamp cap includes a screw lamp cap socket, an insulating fixed plate, an electrode piece of a hot wire, and an electrode piece of a null wire. The null wire electrode is fixed to the screw lamp cap socket. The hot wire electrode is mounted to the screw lamp cap socket via the insulating fixed plate. The hot wire electrode is provided with a flexible plate. The flexible plate extends through the insulating fixed plate and extends into the screw lamp cap socket. The insulating fixed plate is provided with a barrier bar. The barrier bar is disposed between the null wire electrode and the hot wire electrode. The barrier base is configured to increase a creepage distance.

16 Claims, 3 Drawing Sheets

SCREW LAMP CAP AND SCREW LAMP SOCKET

CROSS-REFERENCE TO RELATED APPLICATIONS

This application claims priority to Chinese patent application No. 202222901533.X, filed on Oct. 28, 2022, the content of which is hereby incorporated by reference in its entireties.

TECHNICAL FIELD

The present disclosure relates to the field of a lamp socket, and in particular, to a screw lamp cap and a screw lamp socket.

BACKGROUND

A lamp typically has a screw lamp socket which can supply power to a lamp received in the screw lamp socket. A lamp cap can be screwed into the screw lamp socket.

At present, an electrode serving as a hot wire and an electrode serving as a null wire of a conventional screw lamp socket are usually fixed to a screw lamp cap socket via an insulating fixed plate. Specifically, the hot wire and the null wire extend through the insulating fixed plate and are riveted so as to fix the hot wire to the insulating fixed plate and fix the hot wire to the screw lamp cap socket. No barrier is between the hot wire and the null wire, resulting in a creepage distance between the hot wire and the null wire is not enough, which could trigger a short circuit between the hot wire and the null wire, thus reducing product performance of the screw lamp socket.

SUMMARY

The present disclosure provides a screw lamp cap and a screw lamp socket.

The screw lamp cap includes a screw lamp cap socket, an insulating fixed plate, a hot wire electrode, and a null wire electrode. The null wire electrode is fixed to the screw lamp cap socket. The hot wire electrode is mounted to the screw lamp cap socket via the insulating fixed plate. The hot wire electrode is provided with a flexible plate. The flexible plate extends through the insulating fixed plate and a part of the flexible plate is located in the screw lamp cap socket. The insulating fixed plate is provided with a barrier bar. The barrier bar is disposed between the null wire electrode and the hot wire electrode. The barrier base is configured to increase a creepage distance between the hot wire electrode and the null wire electrode.

In some embodiments, the hot wire electrode is provided with a body of the hot wire electrode. The flexible plate is disposed on the body of the hot wire electrode, and a preset angle is defined between the flexible plate and the body of the hot wire electrode. The body of the hot wire electrode is located on and in contact with the insulating fixed plate.

In some embodiments, the null wire electrode is provided with a body of the null wire electrode which is located on and in contact with the screw lamp cap socket, and the body of the null wire electrode is fixed to the screw lamp cap socket.

In some embodiments, the hot wire electrode is provided with a connecting portion of the hot wire, and the hot wire electrode is capable of being connected to an external hot wire via the connecting portion of the hot wire. The null wire electrode is provided with a connecting portion of the null wire, and the null wire electrode is capable of being connected to an external null wire via the connecting portion of the null wire. The barrier bar is perpendicular to a line between the connecting portion of the hot wire and the connecting portion of the null wire.

In some embodiments, the insulating fixed plate is provided with a first baffle, and the connecting portion of the hot wire abuts against and in contact with the first baffle.

In some embodiments, the insulating fixed plate is provided with a groove. The groove is configured to match with the connecting portion of the null wire. The connecting portion of the null wire is capable of partially extending into the groove, so as to limit the null wire electrode to the insulating fixed plate.

In some embodiments, the screw lamp cap socket is provided with a mounting hole, and the insulating fixed plate wraps around an orifice edge of the mounting hole.

In some embodiments, the insulating fixed plate is provided with a limiting protrusion facing to the flexible plate. The limiting protrusion is configured for limiting an elastic deformation of the flexible plate along a direction towards the insulating fixed plate by abutting against the flexible plate.

In some embodiments, the insulating fixed plate and the screw lamp cap socket are an integral structure.

The screw lamp socket provided in the present disclosure includes any one of the above screw lamp caps, an insulating wrap, a hot wire, and a null wire. The hot wire is electrically connected to the hot wire electrode, and the null wire is electrically connected to the null wire electrode. The hot wire and the null wire are wrapped by the insulating wrap.

BRIEF DESCRIPTION OF THE DRAWINGS

To describe and illustrate embodiments and/or examples of the present disclosure made public here better, reference may be made to one or more of the figures. The additional details or examples used to describe the figures should not be construed as limiting the scope of any of the present disclosure, the embodiments and/or examples currently described, and the best model of the present disclosure as currently understood.

In the figures, 1 represents a screw lamp socket; 100 represents a screw lamp cap; 10 represents a screw lamp cap socket; 11 represents a mounting hole; 111 represents an orifice edge; 20 represents an insulating fixed plate; 21 represents a barrier bar; 22 represents a limiting protrusion; 23 represents a first baffle; 24 represents a groove; 30 represents an electrode piece of a hot wire; 31 represents a flexible plate; 32 represents a body of the hot wire electrode; 33 represents a connecting portion of the hot wire; 40 represents an electrode piece of a null wire; 41 represents a body of the null wire electrode; 42 represents a connecting portion of the null wire; 101 represents a lamp; 200 represents an insulating wrap; 300 represents a hot wire; and 400 represents a null wire.

DETAILED DESCRIPTION

In order to make technical solutions in the present disclosure clearly and completely described, the present disclosure is described in further detail hereinafter with reference to the accompanying drawings. Obviously, the embodiments described are only a portion of the embodiments of the present disclosure, not all the embodiments. Based on the embodiments in the present disclosure, all other embodiments obtained by one skilled in the art without making creative labor fall within the scope of protection of the present disclosure.

It should be noted that when a component is considered to be "arranged" on another component, it may be directly arranged on the other component or an intervening component may be presented. When a component is considered to be "disposed" on another component, it may be directly disposed on the other component or an intervening component may be presented at the same time. When a component is considered to be "fixed" to another component, it may be directly fixed to the other component or an intervening component may be presented at the same time.

Unless otherwise defined, all technical and scientific terms used herein have the same meaning as commonly understood by one skilled in the art to which the present disclosure pertains. The terminology used in the description of the present disclosure is only for the purpose of describing specific embodiments and is not intended to limit the disclosure. As used herein, the term "and/or" includes any and all combinations of one or more associated listed items.

Referring to FIG. 1 to FIG. 4, the present disclosure provides a screw lamp cap 100. The screw lamp cap 100 may be applied to a screw lamp socket 1. The screw lamp cap 100 is configured to match with a lamp and supply power for the lamp.

Figure 1:
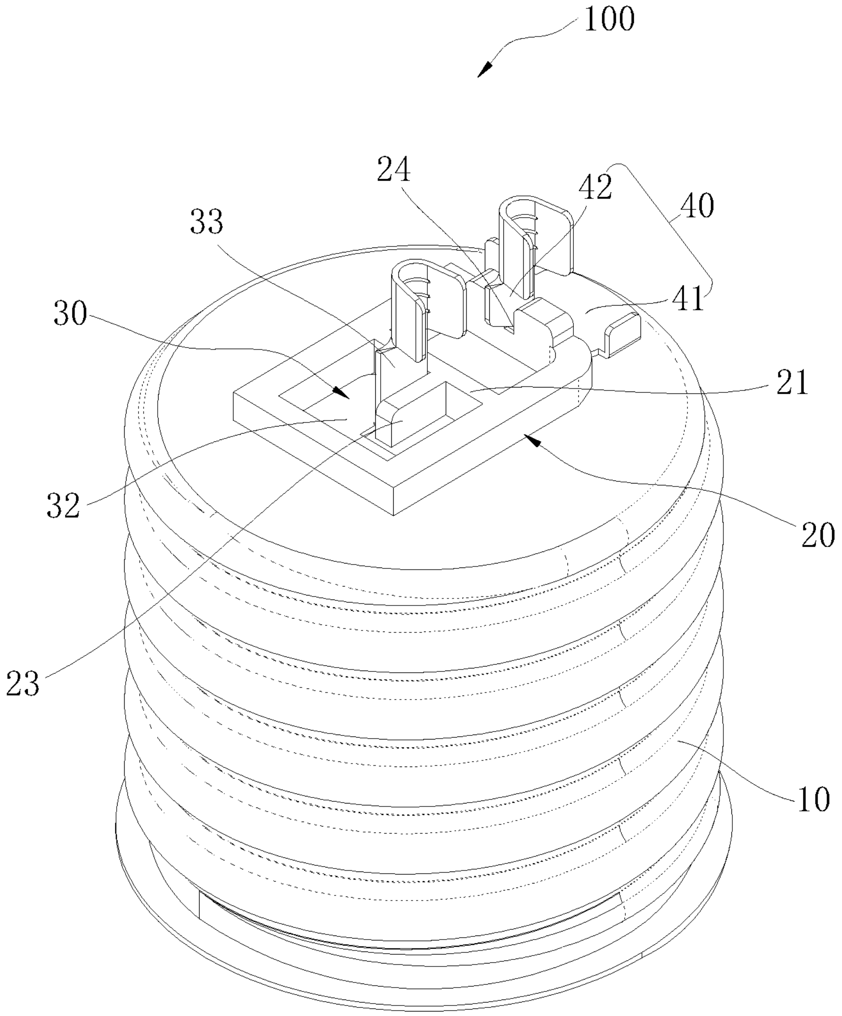
FIG. 1 is a schematic diagram of a screw lamp cap in an embodiment of the present disclosure.
Figure 2:
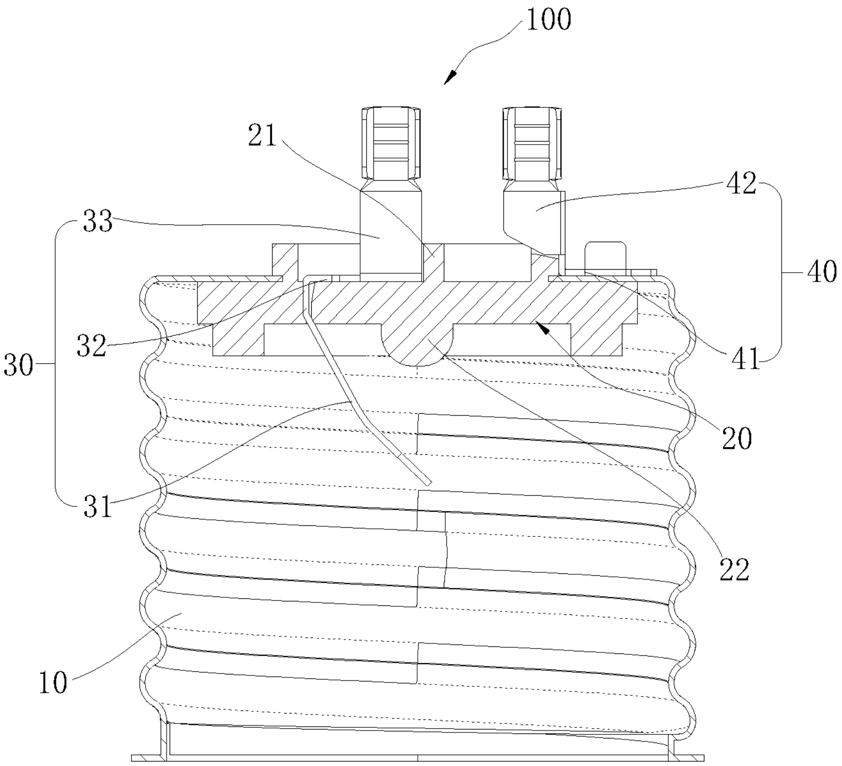
FIG. 2 is a sectional diagram of a screw lamp cap in an embodiment of the present disclosure.

Referring to FIG. 1 and FIG. 2, the screw lamp cap 100 provided in some embodiments includes a screw lamp cap socket 10, an insulating fixed plate 20, a hot wire electrode piece 30, and a null wire electrode 40 of a. The null wire electrode 40 is fixed to the screw lamp cap socket 10. The hot wire electrode 30 is mounted to the screw lamp cap socket 10 via the insulating fixed plate 20. The hot wire electrode 30 is provided with a flexible plate 31. The flexible plate 31 extends through the insulating fixed plate 20 and a part of the flexible plate is located in the screw lamp cap socket 10. The insulating fixed plate 20 is provided with a barrier bar 21. The barrier bar 21 is disposed between the electrode piece 40 of the null wire and the electrode piece 30 of the hot wire, and the barrier base 21 is configured to increase a creepage distance between the electrode piece 30 of the hot wire and the electrode piece 40 of the null wire. In this way, a phenomenon of a short circuit caused by insufficient creepage distance between the electrode piece 30 of the hot wire and the electrode piece 40 of the null wire may be avoided when the screw lamp cap 100 is applied, thereby improving product performance. The phenomenon that the insufficient creepage distance between the electrode piece 30 of the hot wire and the electrode piece 40 of the null wire causes an electrical connection therebetween and a short circuit can be understood by a person skilled in the art, which would not be repeated herein.

Figure 3:
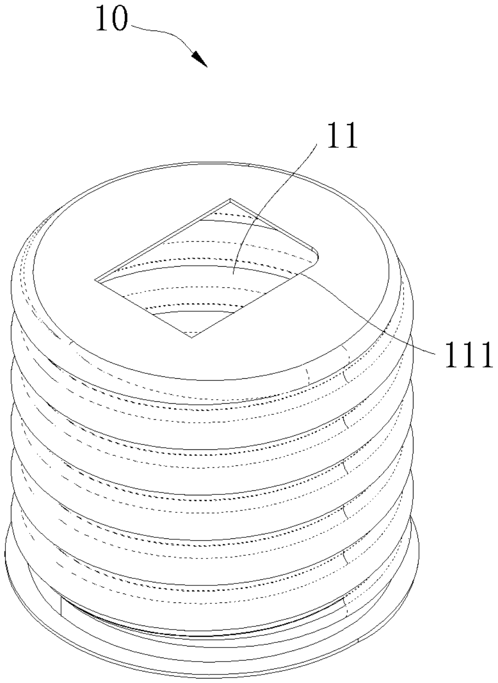
FIG. 3 is a schematic diagram of a screw lamp cap socket in an embodiment of the present disclosure.

Referring to FIG. 3, the screw lamp cap socket 10 can be provided with a mounting hole 11 and the insulating fixed plate 20 may wrap around an orifice edge 111 of the mounting hole 11. In this way, an assembly connection between the insulating fixed plate 20 and the screw lamp cap socket 10 may be achieved, improving stability of the insulating fixed plate 20 assembled on the screw lamp cap socket 10.

In some embodiments, the insulating fixed plate 20 may be provided with a limiting protrusion 22 facing the flexible plate 31. The limiting protrusion 22 is configured for limiting an elastic deformation of the flexible plate 31 along a direction towards the insulating fixed plate 20 by abutting against the flexible plate 31. When the screw lamp cap 100 is applied to the screw lamp socket 1 and assembled with a lamp 101, the limiting protrusion 22 may limit an insertion depth of the lamp 101 screwed into the screw lamp cap 100 by the flexible plate 31, thereby meeting an assembly requirement of the screw lamp cap 100 and the lamp 101.

Specifically, the insulating fixed plate 20 may be integrally injection molded into the screw lamp cap socket 10. That is, the insulating fixed plate 20 and the screw lamp cap socket 10 are an integral structure. The assembly connection between the insulating fixed plate 20 and the screw lamp cap socket 10 may be achieved, and a use requirement of the screw lamp cap 100 may be met.

In some embodiments, the electrode piece 30 of the hot wire may be provided with an electrode piece body 32 of the hot wire, the flexible plate 31 may be disposed on the electrode piece body 32 of the hot wire, a preset angle may be defined between the flexible plate 31 and the electrode piece body 32 of the hot wire, and the electrode piece body 32 of the hot wire may be located on and in contact with the insulating fixed plate 20. In this way, an assembly connection between the electrode piece 30 of the hot wire and the insulating fixed plate 20 may be achieved, which ensures stability of the electrode piece 30 of the hot wire assembled on the insulating fixed plate 20.

In some embodiments, the electrode piece 30 of the hot wire may be provided with a connecting portion 33 of the hot wire, and the electrode piece 30 of the hot wire is capable of being connected to an external hot wire (not shown) via the connecting portion 33 of the hot wire.

Specifically, the connecting portion 33 of the hot wire may be connected to the external hot wire by riveting. In this way, stability of a connection between the electrode piece 30 of the hot wire and the external hot wire may be improved. A simple process of riveting facilitates the connection between the electrode piece 30 of the hot wire and the external hot wire.

In some embodiments, the insulating fixed plate 20 may be provided with a first baffle 23, and the connecting portion 33 of the hot wire may abut against and be in contact with the first baffle 23. In this way, an assembly positioning of the electrode piece 30 of the hot wire on the insulating fixed plate 20 may be achieved by contacting between the connecting portion 33 of the hot wire and the first baffle 23, and it may facilitate installation of the electrode piece 30 of the hot wire to the insulating fixed plate 20.

In some embodiments, the electrode piece 40 of the null wire may be provided with an electrode piece body 41 of the null wire which is located on and in contact with the screw lamp cap socket 10, and the electrode piece body 41 of the null wire may be fixed to the screw lamp cap socket 10 by spot welding. In this way, an assembly connection between the electrode piece 40 of the null wire and the screw lamp cap socket 10 may be achieved, which not only ensures strength of the assembly connection between the electrode piece 40 of the null wire and the screw lamp cap socket 10, but also increases a contact area therebetween and improves conductivity performance therebetween.

In some embodiments, the electrode piece 40 of the null wire may be provided with a connecting portion 42 of the null wire, and the electrode piece 40 of the null wire is capable of being connected to an external null wire (not shown) via the connecting portion 42 of the null wire.

Specifically, the connecting portion 42 of the null wire may be connected to the external null wire by riveting. In this way, stability of a connection between the electrode piece 40 of the null wire and the external null wire may be improved. A simple process of riveting facilitates the connection between the electrode piece 40 of the null wire and the external null wire.

In some embodiments, the insulating fixed plate 20 can be provided with a groove 24. The groove 24 may be configured to match with the connecting portion 42 of the null wire, and the connecting portion 42 of the null wire is capable of partially extending into the groove 24, so as to limit the electrode piece 40 of the null wire to the insulating fixed plate 20. In this way, an assembly positioning of the electrode piece 40 of the null wire on the insulating fixed plate 20 may be achieved by a clamping between the groove 24 and the connecting portion 42 of the null wire, and the assembly positioning may facilitate installation of the electrode piece 40 of the null wire to the screw lamp cap socket 10.

Referring to FIG. 1, the barrier bar 21 may be perpendicular to a line between the connecting portion 33 of the hot wire and the connecting portion 42 of the null wire. This may be an embodiment of a position relationship among the barrier bar 21, the electrode piece 30 of the hot wire, and the electrode piece 40 of the null wire. The barrier bar 21 may be gradient between the electrode piece 30 of the hot wire and the electrode piece 40 of the null wire. In other words, an angle may be defined between the barrier bar 21 and the line between the connecting portion 33 of the hot wire and the connecting portion 42 of the null wire, and the angle may be an acute angle, which would not be repeated herein.

Figure 4:
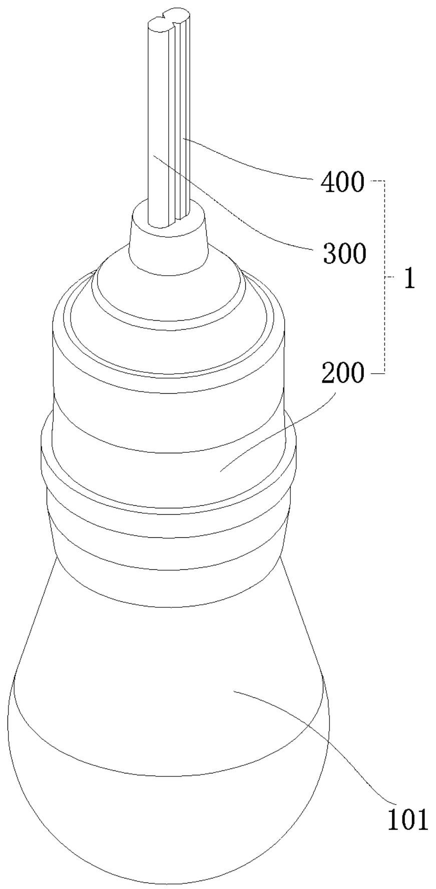
FIG. 4 is a schematic diagram of a screw lamp socket assembled with a lamp in an embodiment of the present disclosure.

Referring to FIG. 4, the present disclosure further provides a screw lamp socket 1. The screw lamp socket 1 includes the above screw lamp cap 100, an insulating wrap 200, a hot wire 300, and a null wire 400. The hot wire 300 is electrically connected to the electrode piece 30 of the hot wire, the null wire 400 is electrically connected to the electrode piece 40 of the null wire, and the hot wire 300 and the null wire 400 are wrapped by the insulating wrap 200.

In summary, the screw lamp cap 100 and the screw lamp socket 1 are provided in the present disclosure. The electrode piece 40 of the null wire may be fixed to the screw lamp cap socket 10, and the barrier bar 21 may be disposed between the electrode piece 30 of the hot wire and the electrode piece 40 of the null wire. In this way, the creepage distance between the electrode piece 30 of the hot wire and the electrode piece 40 of the null wire may be increased. The short circuit caused by insufficient creepage distance between the electrode piece 30 of the hot wire and the electrode piece 40 of the null wire may be avoided when the screw lamp cap 100 is applied, thereby improving product performance.

The technical features of the above-described embodiments may be combined in any combination. For the sake of brevity of description, not all possible combinations of the technical features in the above embodiments are described. However, as long as there is no contradiction between the combinations of these technical features, all should be considered as within the scope of this disclosure.

The above embodiments express only several embodiments of the present application, and their descriptions are more specific and detailed, but they should not be construed as a limitation of the scope of the patent disclosure. It should be noted that for one skilled in the art, several variations and modifications may be made without departing from the conception of the present disclosure, which belong to the scope of protection of the present disclosure. Therefore, the scope of protection of the present disclosure shall be subject to the attached claims.

I claim:

1. A screw lamp cap, comprising a screw lamp cap socket, an insulating fixed plate, a hot wire electrode, and a null wire electrode, wherein the null wire electrode is fixed to the screw lamp cap socket, the hot wire electrode is mounted to the screw lamp cap socket via the insulating fixed plate, the hot wire electrode is provided with a flexible plate, and the flexible plate extends through the insulating fixed plate and a part of the flexible plate is located in the screw lamp cap socket; the screw lamp cap socket is provided with a mounting hole and the insulating fixed plate wraps around an orifice edge of the mounting hole; and the insulating fixed plate is provided with a barrier bar, the barrier bar is disposed between the null wire electrode and the hot wire electrode, and the barrier bar is configured to increase a creepage distance between the hot wire electrode and the null wire electrode.

2. The screw lamp cap of claim 1, wherein the hot wire electrode is provided with a body of the hot wire electrode, the flexible plate is disposed on the body of the hot wire electrode, a preset angle is defined between the flexible plate and the body of the hot wire electrode, and the body of the hot wire electrode is located on and in contact with the insulating fixed plate.

3. The screw lamp cap of claim 1, wherein the null wire electrode is provided with a body of the null wire electrode which is located on and in contact with the screw lamp cap socket, and the body of the null wire electrode is fixed to the screw lamp cap socket.

4. The screw lamp cap of claim 1, wherein the hot wire electrode is provided with a connecting portion of the hot wire, and the hot wire electrode is capable of being connected to an external hot wire via the connecting portion of the hot wire;

the null wire electrode is provided with a connecting portion of the null wire, the null wire electrode is capable of being connected to an external null wire via the connecting portion of the null wire, and the barrier bar is perpendicular to a line between the connecting portion of the hot wire and the connecting portion of the null wire.

5. The screw lamp cap of claim 4, wherein the insulating fixed plate is provided with a first baffle, and the connecting portion of the hot wire abuts against and is in contact with the first baffle.

6. The screw lamp cap of claim 4, wherein the insulating fixed plate is provided with a groove, the groove is configured to match with the connecting portion of the null wire, and the connecting portion of the null wire is capable of partially extending into the groove, so as to limit the null wire electrode to the insulating fixed plate.

7. The screw lamp cap of claim 1, wherein the insulating fixed plate is provided with a limiting protrusion facing to the flexible plate, the limiting protrusion is configured for limiting an elastic deformation of the flexible plate along a direction towards the insulating fixed plate by abutting against the flexible plate.

8. The screw lamp cap of claim 1, wherein the insulating fixed plate and the screw lamp cap socket are an integral structure.

9. A screw lamp socket, comprising the screw lamp cap of claim 1, an insulating wrap, a hot wire, and a null wire, wherein the hot wire is electrically connected to the hot wire electrode, the null wire is electrically connected to the null wire electrode, and the hot wire and the null wire are wrapped by the insulating wrap.

10. The screw lamp socket of claim 9, wherein the hot wire electrode is provided with a body of the hot wire electrode, the flexible plate is disposed on the body of the hot wire electrode, a preset angle is defined between the flexible plate and the body of the hot wire electrode, and the body of the hot wire electrode is located on and in contact with the insulating fixed plate.

11. The screw lamp socket of claim 9, wherein the null wire electrode is provided with a body of the null wire electrode which is located on and in contact with the screw lamp cap socket, and the body of the null wire electrode is fixed to the screw lamp cap socket.

12. The screw lamp socket of claim 9, wherein the hot wire electrode is provided with a connecting portion of the hot wire, the hot wire electrode is capable of being connected to an external hot wire via the connecting portion of the hot wire;

the null wire electrode is provided with a connecting portion of the null wire, the null wire electrode is capable of being connected to an external null wire via the connecting portion of the null wire, and the barrier bar is perpendicular to a line between the connecting portion of the hot wire and the connecting portion of the null wire.

13. The screw lamp socket of claim 12, wherein the insulating fixed plate is provided with a first baffle, and the connecting portion of the hot wire abuts against and is in contact with the first baffle.

14. The screw lamp socket of claim 12, wherein the insulating fixed plate is provided with a groove, the groove is configured to match with the connecting portion of the null wire, and the connecting portion of the null wire is capable of partially extending into the groove, so as to limit the null wire electrode to the insulating fixed plate.

15. The screw lamp socket of claim 9, wherein the insulating fixed plate is provided with a limiting protrusion facing to the flexible plate, the limiting protrusion is configured for limiting an elastic deformation of the flexible plate along a direction towards the insulating fixed plate by abutting against the flexible plate.

16. The screw lamp socket of claim 9, wherein the insulating fixed plate and the screw lamp cap socket are an integral structure.

* * * * *